(12) United States Patent
Kojima

(10) Patent No.: US 7,804,081 B2
(45) Date of Patent: Sep. 28, 2010

(54) RADIATION CONVERSION PANEL, AND APPARATUS FOR AND METHOD OF READING RADIATION IMAGE INFORMATION FROM RADIATION CONVERSION PANEL

(75) Inventor: Tetsuya Kojima, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 418 days.

(21) Appl. No.: 11/865,031

(22) Filed: Sep. 30, 2007

(65) Prior Publication Data

US 2008/0078964 A1 Apr. 3, 2008

(30) Foreign Application Priority Data

Sep. 29, 2006 (JP) ............................. 2006-268290

(51) Int. Cl.
G03B 42/08 (2006.01)
(52) U.S. Cl. ...................................... 250/580
(58) Field of Classification Search ............. 250/484.4, 250/581, 582, 583, 584, 585, 586, 587, 588, 250/580
See application file for complete search history.

(56) References Cited

U.S. PATENT DOCUMENTS

2003/0141469 A1  7/2003  Agano

2005/0211932 A1  9/2005  Kuwabara
2007/0096040 A1* 5/2007  Hasegawa et al. ........ 250/484.4

FOREIGN PATENT DOCUMENTS

| JP | 2003-210443 A | 7/2003 |
| JP | 2005-283798 A | 10/2005 |

* cited by examiner

*Primary Examiner*—David P Porta
*Assistant Examiner*—Mark R Gaworecki
(74) *Attorney, Agent, or Firm*—Sughrue Mion, PLLC

(57) ABSTRACT

A radiation conversion panel allows recorded radiation image information to be read therefrom with high accuracy while reliably avoiding adverse effects of residual past radiation image information that remains in the radiation conversion panel. When a radiation conversion panel storing radiation image information therein is scanned by reading light from a reading light source, the radiation image information is read from first linear electrode layers, and scanned position information is read from a first linear electrode layer of a marker. A corrector corrects presently read radiation image information based on past radiation image information and scanned position information to acquire radiation image information free from the effect of a residue of the past radiation image information.

11 Claims, 15 Drawing Sheets

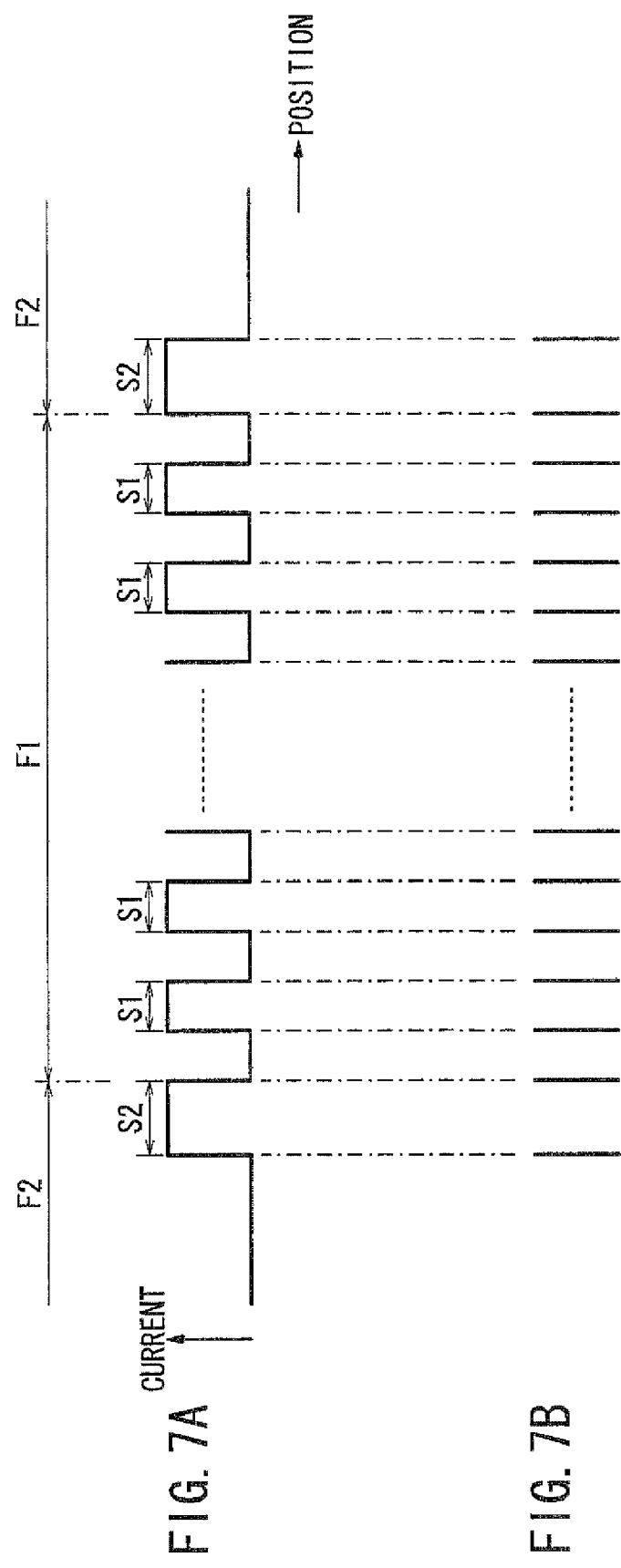

RADIATION CONVERSION PANEL, AND APPARATUS FOR AND METHOD OF READING RADIATION IMAGE INFORMATION FROM RADIATION CONVERSION PANEL

BACKGROUND OF THE INVENTION

1. Field of the Invention

The present invention relates to a radiation conversion panel for recording radiation image information by being irradiated with a radiation and for allowing recorded radiation image information to be read by being scanned with reading light, and an apparatus for and a method of reading radiation image information from such a radiation conversion panel.

2. Description of the Related Art

There has heretofore been known a light-reading-type radiation image information reading apparatus for applying a radiation to a subject, storing the radiation that has passed through the subject in a semiconductor radiation conversion panel, and thereafter scanning the radiation conversion panel with reading light to acquire radiation image information as electric charge information from the position where the radiation conversion panel is scanned for the purpose of medically diagnosing the subject (see Japanese Laid-Open Patent Publication No. 2003-210443). Another known radiation image information reading apparatus employs a radiation conversion panel in the form of a stimulable phosphor panel which emits stimulated light depending on stored energy when it is irradiated with stimulating light such as visible light. When the stimulable phosphor panel is irradiated with stimulating light such as a laser beam or the like, the stimulable phosphor panel emits stimulated light representing radiation image information that is photoelectrically read (see Japanese Laid-Open Patent Publication No. 2005-283798).

With the radiation image information reading apparatus which employs the radiation conversion panel, it is difficult to read all the radiation image information recorded in the radiation conversion panel, and part of the radiation image information tends to remain in the radiation conversion panel. If the radiation conversion panel with remaining radiation image information is used again, then the remaining radiation image information acts as noise, producing fog on new radiation image information. Therefore, it is necessary to perform a corrective process for removing the remaining radiation image information from the new radiation image information.

According to Japanese Laid-Open Patent Publication No. 2003-210443 and Japanese Laid-Open Patent Publication No. 2005-283798, after radiation image information G1 (see FIG. 15A of the accompanying drawings) is read from a radiation conversion panel, next radiation image information G2 is recorded on the radiation conversion panel. Then, when the radiation image information G2 is read from the radiation conversion panel, the radiation image information G2 that is read contains remaining radiation image information G1' (see FIG. 15B of the accompanying drawings) which is a residue of the past radiation image information G1. The read radiation image information G2 is stored in a memory. Then, the residual radiation image information G1' that is calculated from the past radiation image information G1 is subtracted from the radiation image information G2, thereby producing desired radiation image information G2.

For reading the radiation image information from the radiation conversion panel in the light-reading-type radiation image information reading apparatus, the radiation conversion panel is scanned with reading light or stimulating light in the direction indicated by the arrow C. The radiation image information G2 read from the radiation conversion panel cannot properly be corrected unless the relationship between the position where radiation conversion panel is scanned with the reading light or stimulating light and the radiation image information read from the scanned position.

For example, if the scanning speed of the reading light or stimulating light for reading the past radiation image information G1 from the radiation conversion panel and the scanning speed of the reading light or stimulating light for reading the next radiation image information G2 from the radiation conversion panel are different from each other, or if the positions where the radiation image information G1, G2 starts being read are different from each other, then the residual radiation image information G1' cannot properly be subtracted from the radiation image information G2 at the corresponding position, and hence the radiation image information G2 cannot properly be corrected.

SUMMARY OF THE INVENTION

It is an object of the present invention to provide a radiation conversion panel for allowing recorded radiation image information to be read therefrom with high accuracy while reliably avoiding adverse effects of residual past radiation image information that remains in the radiation conversion panel, and an apparatus for and a method of reading radiation image information from such a radiation conversion panel.

According to the present invention, there is provided a radiation conversion panel for recording therein radiation image information by being irradiated with a radiation and for allowing recorded radiation image information to be read by being scanned with reading light, comprising a marker for acquiring scanned position information representing a position where the radiation conversion panel is scanned by the reading light, wherein both the radiation image information and the scanned position information can be read by the reading light.

According to the present invention, there is also provided an apparatus for reading radiation image information stored in a radiation conversion panel for recording therein radiation image information by being irradiated with a radiation and for allowing recorded radiation image information to be read by being scanned with reading light, comprising reading means for scanning the radiation conversion panel, which has a marker for acquiring scanned position information representing a position where the radiation conversion panel is scanned by the reading light, with the reading light, to read the radiation image information and the scanned position information, storing means for storing the radiation image information in association with the scanned position information, and correcting means for correcting the radiation image information associated with the scanned position information read by the reading means, based on a residue of past radiation image information remaining in the radiation conversion panel after the radiation image information has been read therefrom, and associated with the scanned position information.

According to the present invention, there is also provided an apparatus for reading radiation image information stored in a radiation conversion panel for recording therein radiation image information by being irradiated with a radiation and for allowing recorded radiation image information to be read by being scanned with reading light, comprising reading means for scanning the radiation conversion panel, which has a marker for acquiring scanned position information representing a position where the radiation conversion panel is scanned by the reading light, with the reading light, to read the radiation image information and the scanned position information, storing means for storing the radiation image information in association with the scanned position information, and correcting means for correcting desired radiation image information stored in the radiation conversion panel and associated with the scanned position information read from the radiation conversion panel by the reading means, based on a residue of the radiation image information and the scanned position information remaining in the radiation conversion panel and read therefrom by the reading means.

According to the present invention, there is further provided a method of reading radiation image information stored in a radiation conversion panel for recording therein radiation image information by being irradiated with a radiation and for allowing recorded radiation image information to be read by being scanned with reading light, comprising the steps of scanning the radiation conversion panel, which has a marker for acquiring scanned position information representing a position where the radiation conversion panel is scanned by the reading light, with the reading light, to read the radiation image information and the scanned position information, storing the radiation image information in association with the scanned position information, and correcting the radiation image information associated with the scanned position information read by the reading means, based on a residue of past radiation image information remaining in the radiation conversion panel after the radiation image information has been read therefrom, and associated with the scanned position information.

According to the present invention, there is still further provided a method of reading radiation image information stored in a radiation conversion panel for recording therein radiation image information by being irradiated with a radiation and for allowing recorded radiation image information to be read by being scanned with reading light, comprising the steps of scanning the radiation conversion panel, which has a marker for acquiring scanned position information representing a position where the radiation conversion panel is scanned by the reading light, with the reading light, to read the radiation image information and the scanned position information, storing the radiation image information in association with the scanned position information, and correcting desired radiation image information stored in the radiation conversion panel and associated with the scanned position information read from the radiation conversion panel by the reading means, based on a residue of the radiation image information and the scanned position information remaining in the radiation conversion panel and read therefrom by the reading means.

According to the present invention, since the position where the radiation conversion panel is scanned by the reading light can accurately be recognized, the radiation image information can be read highly accurately while reliably avoiding adverse effects of residual past radiation image information that remains in the radiation conversion panel.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 7A and 7B are diagrams illustrative of scanned position information;

DESCRIPTION OF THE PREFERRED EMBODIMENTS

Embodiments of the present invention will be described below with reference to the accompanying drawings.

Figure 1:
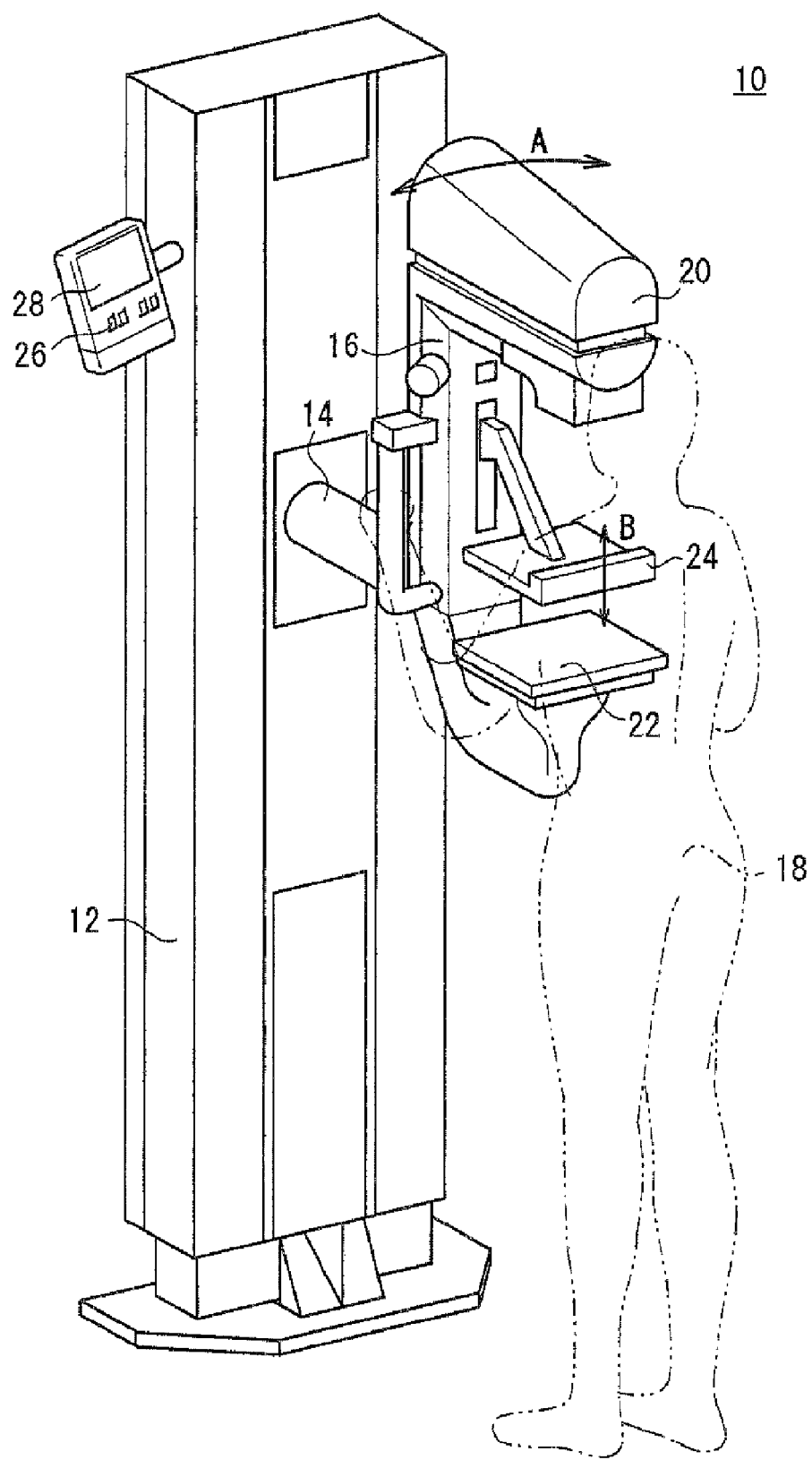
FIG. 1 is a perspective view of a mammographic system according to an embodiment of the present invention.

FIG. 1 shows in perspective a mammographic system 10 according to an embodiment of the present invention, which incorporates a radiation image information reading apparatus according to the present invention.

As shown in FIG. 1, the mammographic system 10 includes an upstanding base 12, a vertical arm 16 fixed to a horizontal swing shaft 14 disposed substantially centrally on the base 12, a radiation source housing unit 20 housing a radiation source for applying a radiation to a subject 18 and fixed to an upper end of the arm 16, an image capturing base 22 housing a solid-state detector for detecting a radiation that has passed through the subject 18 and fixed to a lower end of the arm 16, and a presser plate 24 for pressing and holding a breast 30 (see FIG. 2) of the subject 18 against the image capturing base 22.

When the arm 16, to which the radiation source housing unit 20 and the image capturing base 22 are secured, is angularly moved about the swing shaft 14 in the directions indicated by the arrow A, an image capturing direction with respect to the breast of the subject 18 is adjusted. The presser plate 24 is connected to the arm 16 and disposed between the radiation source housing unit 20 and the image capturing base 22. The presser plate 24 is vertically displaceable along the arm 16 in the directions indicated by the arrow B.

To the base 12, there are connected a control panel 26 for entering image capturing information including the ID information of the subject 18, an image capturing region of the subject 18, a tube voltage, a target type, etc., and a display panel 28 for displaying the entered image capturing information. The control panel 26 and the display panel 28 may be mounted on a console, not shown, connected to the mammographic system 10, rather than being mounted on the mammographic system 10 itself.

Figure 2:
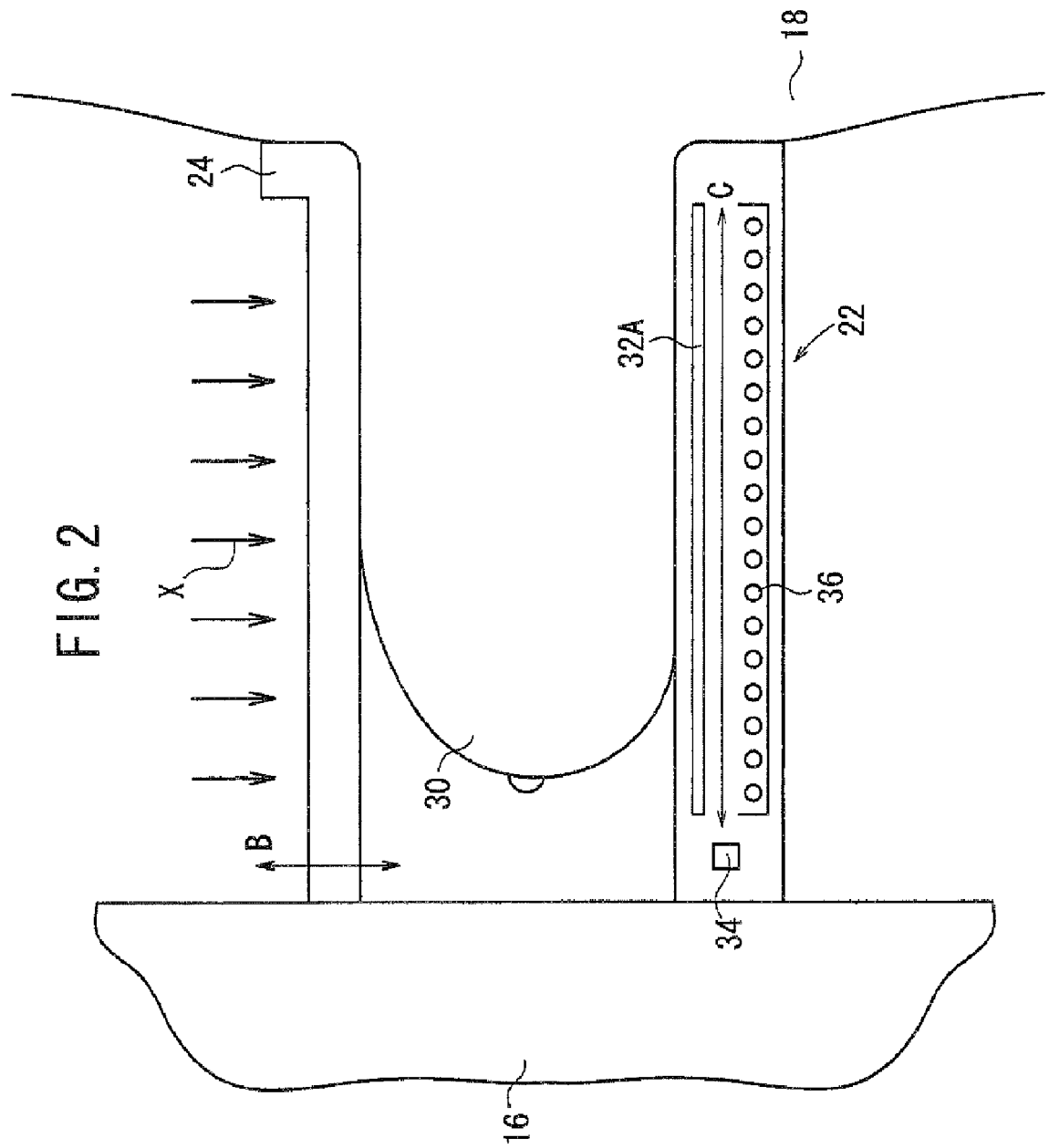
FIG. 2 is a fragmentary vertical elevational view, partly in cross section, showing internal structural details of an image capturing base of the mammographic system shown in FIG. 1.

FIG. 2 shows internal structural details of the image capturing base 22 of the mammographic system 10. In FIG. 2, the breast 30 of the subject 18 is shown as being placed between the image capturing base 22 and the presser plate 24.

As shown in FIG. 2, the radiation source housing unit 20 houses therein a radiation conversion panel 32A for detecting a radiation X emitted from a target placed in the radiation source housing unit 20, a reading light source 34 for applying reading light to the radiation conversion panel 32A to read the information of the radiation X detected by the radiation conversion panel 32A, and an erasing light source 36 for applying erasing light to the radiation conversion panel 32A to remove unwanted electric charges stored in the radiation conversion panel 32A.

The reading light source 34 includes, for example, a line light source comprising a linear array of LEDs which extends perpendicularly to the sheet of FIG. 2. The line light source moves along the directions indicated by the arrow C (scanning directions) and applies reading light to the entire surface of the radiation conversion panel 32A.

Figure 3:
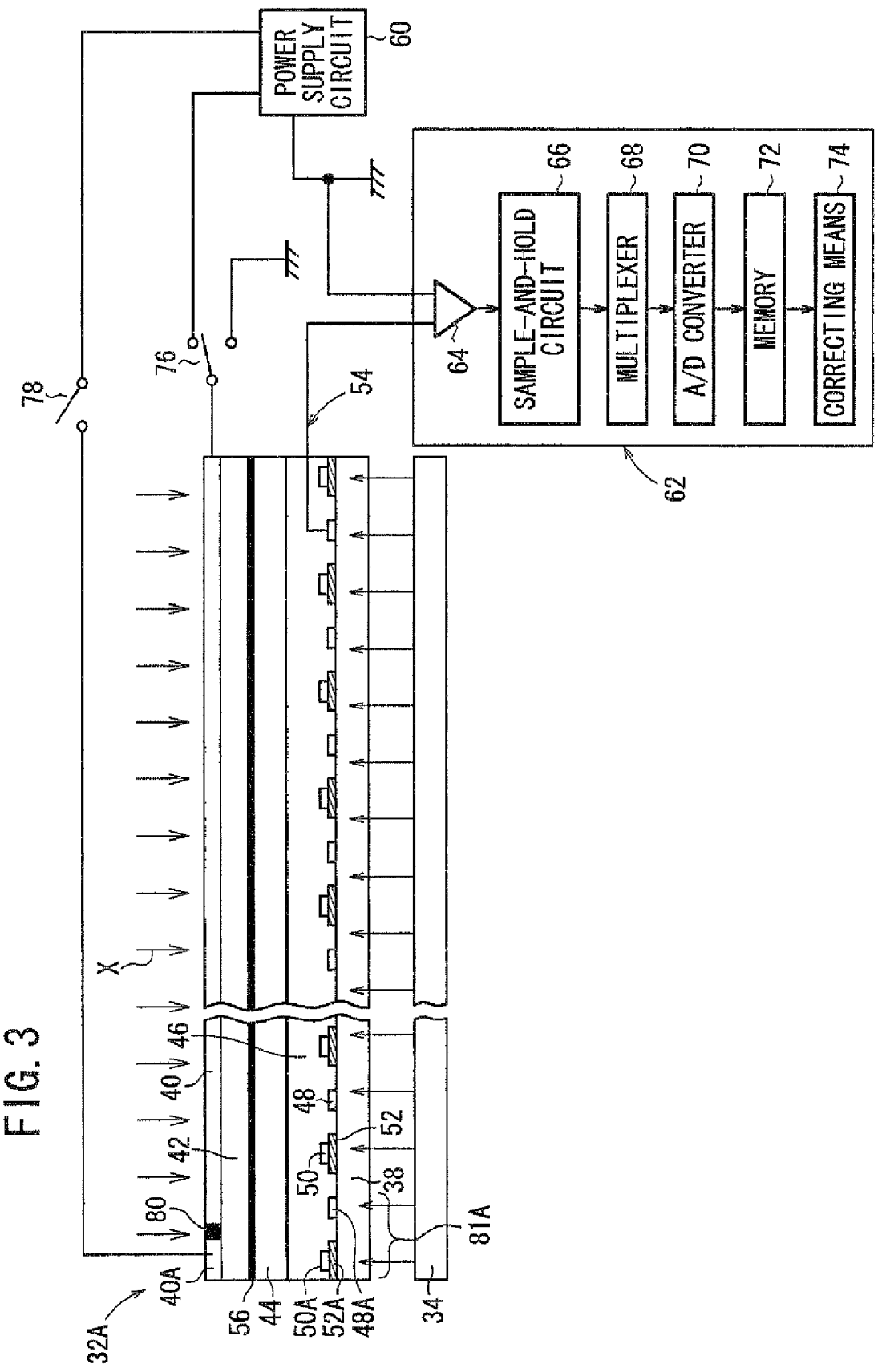
FIG. 3 is a diagram, partly in block form, showing a control circuit including a radiation detector in the mammographic system shown in FIG. 1.

FIG. 3 shows in block form a control circuit of the mammographic system 10 including the radiation conversion panel 32A. The radiation conversion panel 32A comprises a direct-conversion, light-reading radiation solid-state detector. When the radiation conversion panel 32A is irradiated with the radiation X that carries radiation image information, the radiation conversion panel 32A stores the radiation image information as latent image charges representing charge information. When the radiation conversion panel 32A is subsequently scanned with reading light, the radiation conversion panel 32A generates a current depending on the stored latent image charges.

More specifically, the radiation conversion panel 32A includes a glass substrate 38 and a region for recording radiation image information therein, the region being disposed on the glass substrate 38. The region for recording radiation image information therein comprises a laminated assembly of a first electrode layer 40 which is permeable to the radiation X that has passed through the breast 30 (FIG. 2), a recording photoconductive layer 42 which becomes electrically conductive when irradiated with the radiation X, a charge transport layer 44 which acts substantially as an insulator with respect to the latent image electric charges (for example, the transport electric charges are negative), while acting substantially as an electric conductor with respect to transport electric charges which are of a polarity opposite to the latent image electric charges (for example, the transport electric charges are positive when the latent image electric charges are negative), a reading photoconductive layer 46 which becomes electrically conductive when irradiated with the reading light, and a second electrode layer 54 including a plurality of first linear electrode layers 48 which are permeable to the reading light and the erasing light, a plurality of second linear electrode layers 50 which are disposed between the first linear electrode layers 48 and which are permeable to the erasing light, and a plurality of linear insulating layers 52 which are disposed across the second linear electrode layers 50 from the reading photoconductive layer 46 and which are impermeable to the reading light and permeable to the erasing light. A charge storage region 56 for storing the latent image electric charges therein is disposed between the recording photoconductive layer 42 and the charge transport layer 44. The second electrode layer 54 which includes the first linear electrode layers 48, the second linear electrode layers 50, and the linear insulating layers 52 extends in the directions indicated by the arrow C (FIG. 2) along which the reading light source 34 as the line light source 34 is movable.

The first electrode layer 40 comprises a two-dimensional planar electrode. The first electrode layer 40 may be made of NESA film ($SiO_2$), ITO (Indium Tin Oxide), IDIXO (Idemitsu Indium X-metal Oxide) which is amorphous light-permeable oxide film, Al, Au, or the like.

The recording photoconductive layer 42 may be made of a photoconductive material containing, as a chief component, at least one of amorphous selenium (a-Se), lead oxide (II) or lead iodide (II) such as PbO, $PbI_2$, or the like, $Bi_{12}(Ge,Si)O_{20}$, and $Bi_2I_3$/organic polymer nanocomposite, etc.

The charge transport layer 44 should provide a greater difference (e.g., $10^2$ or greater, or preferably $10^3$ or greater) between the mobility of negative charges developed in the first electrode layer 40 and the mobility of positive charges developed in the charge transport layer 44. The charge transport layer 44 may be made of an organic compound such as poly(N-vinylcarbazole) (PVK), N,N'-diphenyl-N,N'-bis(3-methylphenyl)-[1,1'-biphenyl]-4,4'-diamine (TPD), discotic liquid crystal, or the like, a polymer (polycarbonate, polystyrene, PUK) dispersed with TPD, or a semiconductive substance such as a-Se or the like that is doped with 10 to 200 ppm of Cl. Particularly, the organic compound (PVK, TPD, discotic liquid crystal, or the like) is preferable as it is photo-insensitive. As the organic compound is generally of a small dielectric constant, it reduces the capacitance of the charge transport layer 44 and the reading photoconductive layer 46, thereby increasing the efficiency with which signals are read. The term "photoinsensitive" means that a photoinsensitive material exhibits substantially no electric conductivity when irradiated with the radiation X and the reading light.

The reading photoconductive layer 46 may be made of a photoconductive material containing, as a chief component, at least one of a-Se, Se—Te, Se—As—Te, metal-free phthalocyanine, metal phthalocyanine, MgPc (Magnesium Phthalocyanine), VoPc (phase II of Vanadyl Phthalocyanine), CuPc (Copper Phthalocyanine), etc.

As with the first electrode layer 40, the first linear electrode layers 48 and the second linear electrode layers 50 may be made of ITO, IDIXO, Al, Au, or the like. As the reading photoconductive layer 46 and the second linear electrode layers 50 need to be electrically connected to each other, the reading photoconductive layer 46 is disposed directly on the second linear electrode layers 50 in the present embodiment.

If the reading light is blue light having a wavelength in the range from 400 nm to 480 nm and the erasing light is red light having a wavelength in the range from 580 nm to 700 nm, then the linear insulating layers 52 may be made of an insulating material which is red that is complementary to blue, such as diaminoanthraquinonyl red, dispersed in an acrylic resin. If the reading light is red light having a wavelength in the range from 580 nm to 700 nm and the erasing light is blue light having a wavelength in the range from 400 nm to 480 nm, then the linear insulating layers 52 may be made of an insulating material which is red that is complementary to blue, such as copper phthalocyanine dispersed in an acrylic resin.

The radiation conversion panel 32A has an end, positioned outside of the region for recording radiation image information therein, incorporating therein a marker 81A for acquiring scanned position information representative of the position on the radiation conversion panel 32A where it is scanned by the reading light, along the directions in which the reading light source 34 is movable, i.e., the directions indicated by the arrow C.

Figure 4:
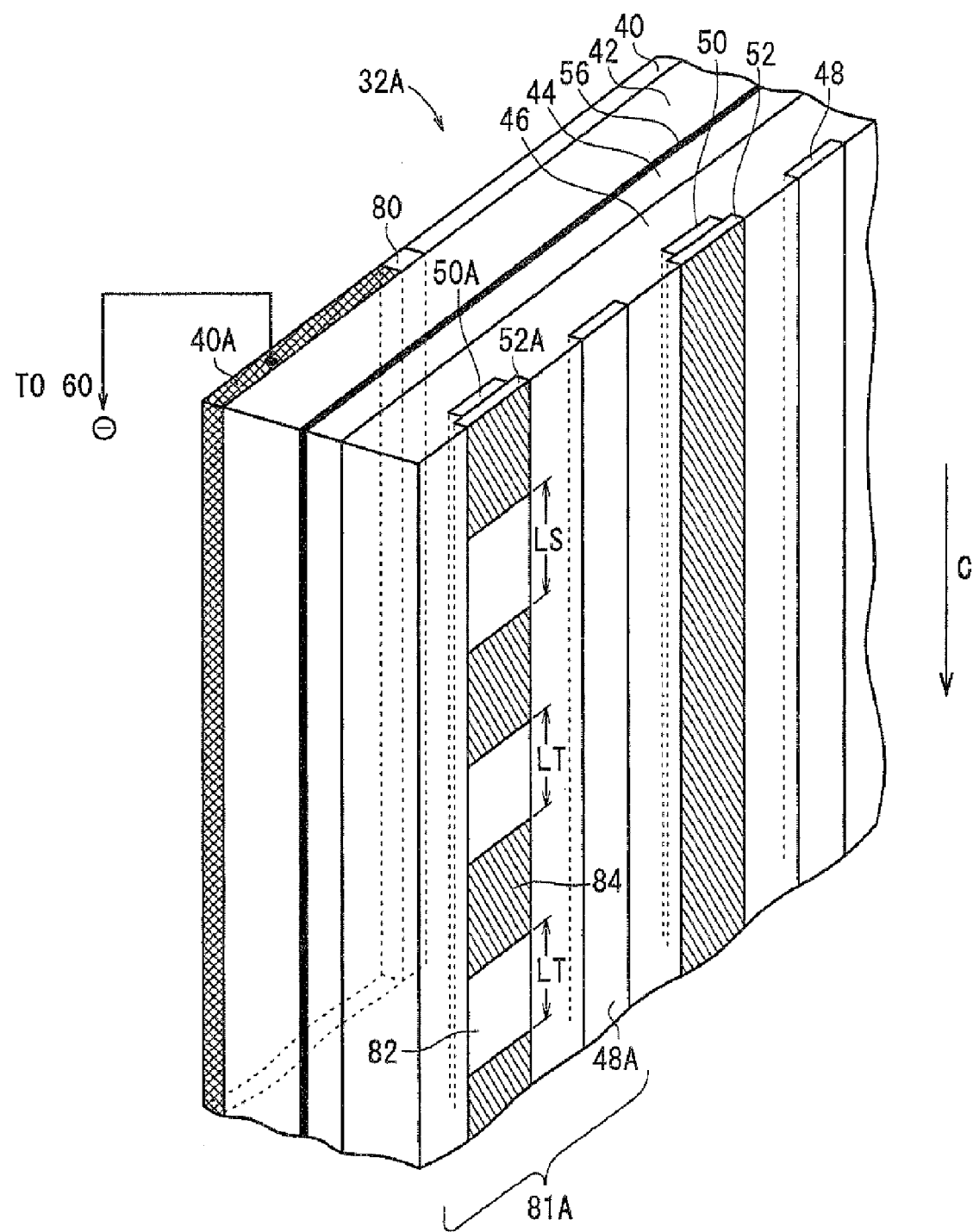
FIG. 4 is an enlarged fragmentary perspective view of a radiation conversion panel according to the embodiment of the present invention.

FIG. 4 shows the marker 81A of the radiation conversion panel 32A at an enlarged scale. In FIG. 4, the glass substrate 38 is omitted from illustration. The marker 81A basically comprises a first linear electrode layer 48A, a linear insulating layer 52A, a second linear electrode layer 50A, a first electrode layer 40A, and an insulating layer 80.

The linear insulating layer 52A comprises an alternate array of transmissive areas 82 for transmitting the reading light therethrough and light-blocking areas 84 for blocking the reading light, which are arranged at suitable intervals, for acquiring the scanned position information representative of the position on the radiation conversion panel 32A where it is scanned by the reading light from the reading light source 34. The transmissive areas 82 may be formed by peeling off segments of the linear insulating layer 52A. The transmissive areas 82 include a group of transmissive areas 82 located in a region F1 (see FIGS. 7A and 7B) which corresponds to the region for recording radiation image information therein, and another group of transmissive areas 82 located in a region F2 outside of the region F1. The transmissive areas 82 located in the region F1 have a width LT which is smaller than the width LS of the transmissive areas 82 located in the region F2.

The first electrode layer 40A, which is positioned opposite the linear insulating layer 52A, should preferably be made of a material which serves as a shield against the radiation. The first electrode layer 40A is electrically isolated from the first electrode layer 40 by the insulating layer 80.

A control circuit connected to the radiation conversion panel 32A will be described below with reference to FIG. 3. The control circuit basically comprises a power supply circuit 60 connected to the first electrode layers 40, 40A of the radiation conversion panel 32A for applying voltages to the first electrode layers 40, 40A, respectively, through respective switches 76, 78, and a reader 62 (reading means) connected to the first linear electrode layers 48, 48A of the radiation conversion panel 32A for reading radiation image information and scanned position information.

The reader 62 comprises a charge amplifier 64 connected to the first linear electrode layers 48, 48A of the second electrode layer 54 of the radiation conversion panel 32A for converting currents from the first linear electrode layers 48, 48A into voltages and integrating the voltages, a sample-and-hold circuit 66 for sampling and holding the output voltages from the charge amplifier 64 at predetermined times, a multiplexer 68 for switching between the output voltages that have been sampled and held by the sample-and-hold circuit 66 with respect to the first linear electrode layers 48, 48A, an A/D converter 70 for converting analog signals representing the output voltages of the first linear electrode layers 48, 48A from the multiplexer 68 into digital signals, a memory 72 for storing the digital signals from the A/D converter 70 as representing the radiation image information and the scanned position information, and a correcting means 74 for correcting the radiation image information based on the past radiation image information and the scanned position information that are stored in the memory 72.

The mammographic system 10 according to the first embodiment of the present invention is basically constructed as described above. Operation of the mammographic system 10 will be described below.

Using the control panel 26 attached to the mammographic system 10, the non-illustrated console, an ID card, etc., the radiographic technician or operator enters image capturing information including the ID information of the subject 18, an image capturing direction, an image capturing region, a tube voltage to be applied to the radiation source, etc.

After having entered the image capturing information, the operator places the mammographic system 10 into a certain state according to the specified image capturing direction. For example, the breast 30 may be imaged as a cranio-caudal view (CC) taken from above, a medio-lateral view (ML) taken outwardly from the center of the chest, or a medio-lateral oblique view (MLO) taken from an oblique view. Depending on information of a selected one of these image capturing directions, the operator turns the arm 16 about the swing shaft 14.

Then, the operator places the subject 18 into a specified image capturing state with respect to the mammographic system 10. For example, if the left breast 30 of the subject 18 is to be imaged as a cranio-caudal view (CC), then the operator places the left breast 30 on the image capturing base 22, and thereafter lowers the presser plate 24 to hold the breast 30 between the image capturing base 22 and the presser plate 24, as shown in FIG. 2.

After the above preparatory process is completed, the power supply circuit 60 applies a high voltage to the first electrode layer 40 of the radiation conversion panel 32A in the image capturing base 22 through the switch 76. The tube voltage and the tube current that have been set with the control panel 26 are applied to the radiation source in the radiation source housing unit 20, which emits and applies the radiation X to the breast 30 to capture a radiation image thereof. Before the radiation X is applied, it is desirable to energize the erasing light source 36 to apply erasing light to the radiation conversion panel 32A to remove unwanted electric charges that are stored in the radiation conversion panel 32A.

When the radiation X is applied to the breast 30, the radiation X acquires radiation image information of the breast 30 as it passes through the breast 30, and is applied to the radiation conversion panel 32A. When the radiation X is applied to the radiation conversion panel 32A, pairs of positive and negative electric charges are generated in the recording photoconductive layer 42, and the negative electric charges move into the charge storage region 56 according to a striped electric field distribution. The positive electric charges generated in the recording photoconductive layer 42 are attracted to the first electrode layer 40 in which they are combined with the negative electric charges and are eliminated. In this manner, the charge storage region 56 stores latent image electric charges (negative charges) as electric charge information representing the radiation image information of the breast 30.

Then, the radiation image information stored in the charge storage region 56 is read as follows: For reading the latent image electric charges representing the radiation image information from the charge storage region 56, the switch 76 is shifted to connect the first electrode layer 40 to ground. The switch 78 is turned on to apply a low voltage to the first electrode layer 40A. Then, the linear reading light source 34 which extends in the direction perpendicular to the direction in which the first linear electrode layers 48, 48A of the second electrode layer 54 extend, is moved in one of the directions indicated by the arrow C to scan the second electrode layer 54 of the radiation conversion panel 32A while applying reading light thereto.

Figure 5:
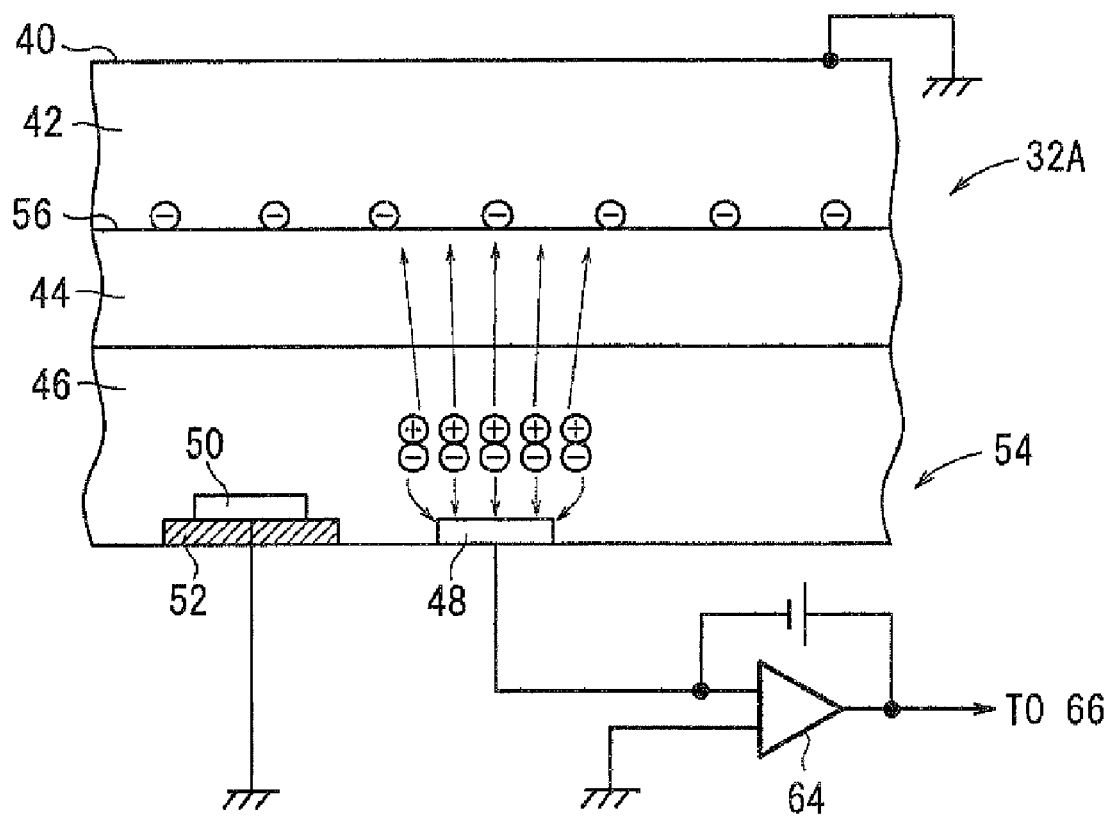
FIG. 5 is an enlarged fragmentary cross-sectional view of the radiation conversion panel, illustrating the manner in which radiation image information recorded in a charge storage region is read therefrom.

FIG. 5 shows in enlarged fragmentary cross section the radiation conversion panel 32A, illustrating the manner in which the radiation image information of the breast 30 recorded in the charge storage region 56 is read therefrom. When the reading light from the reading light source 34 is applied to the reading photoconductive layer 46, pairs of positive and negative electric charges are generated in the reading photoconductive layer 46. The generated positive electric charges are attracted toward the latent image electric charges (negative charges) representing the radiation image information stored in the charge storage region 56 and move through the charge transport layer 44. When the positive electric charges are combined with the latent image electric charges (negative electric charges) in the charge storage region 56, the positive electric charges are eliminated. The negative electric charges in the reading photoconductive layer 46 are combined with positive electric charges introduced into the first linear electrode layers 48, and are eliminated. A current generated due to the movement of the electric charges for electric charge recombination is output as representing the radiation image information to the charge amplifier 64 of the reader 62.

Figure 6A:
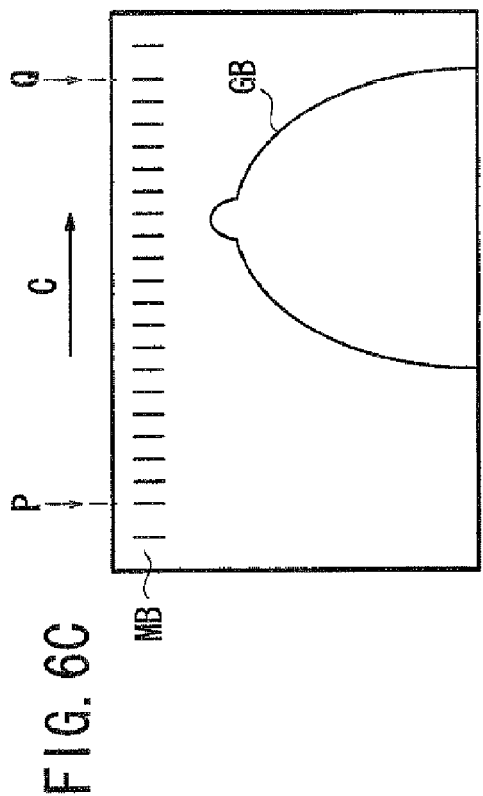
FIGS. 6A through 6D are diagrams illustrative of a process of correcting radiation image information.

The charge amplifier 64 converts the current supplied from each of the first linear electrode layer 48 at each position scanned by the reading light source 34 into a voltage and integrates the voltage. The integrated voltage is sampled and held by the sample-and-hold circuit 66. The multiplexer 68 switches between the currents from the respective first linear electrode layers 48. The current from the multiplexer 68 is converted by the A/D converter 70 into a digital signal which is recorded as radiation image information GA shown in FIG. 6A in the memory 72.

At the same time that the radiation image information GA is read, scanned position information MA is read from the marker 81A.

Specifically, when the reading light from the reading light source 34 is applied to the reading photoconductive layer 46 successively through the transmissive areas 82 between the light-blocking areas 84 of the linear insulating layer 52A, pairs of positive and negative electric charges are generated in the reading photoconductive layer 46. Since a negative voltage is applied to the first electrode layer 40A to generate an electric field directed from the reading photoconductive layer 46 to the first electrode layer 40A, the generated positive electric charges move through the charge transport layer 44 under the electric field, and then are combined with the negative electric charges in the charge storage region 56, and are eliminated. The negative electric charges in the reading photoconductive layer 46 move into the first linear electrode layer 48A under the electric field and then flow into the charge amplifier 64. The negative electric charges are detected as a current representing scanned position information MA shown in FIG. 6A, which is stored together with the radiation image information GA in the memory 72.

The current representing scanned position information MA is generated only when the reading light scans the transmissive areas 82 of the linear insulating layer 52A. Therefore, the current has a pulsed waveform shown in FIG. 7A depending on the layout of the transmissive areas 82. Current pulses having a pulse duration S1 are generated when the reading light scans the transmissive areas 82 which have the width LT, and current pulses having a pulse duration S2 are generated when the reading light scans the transmissive areas 82 which have the width LS. The current pulses having the pulse duration S1 correspond to the region F1 corresponding to the region for recording radiation image information therein, and the current pulses having the pulse duration S2 correspond to the region F2 outside of the region F1. FIG. 7B shows the scanned position information MA that is recorded in the memory 72 in association with the pulsed waveform shown in FIG. 7A. The scanned position information MA is associated with the positions of the transmissive areas 82 of the marker 81A in the radiation conversion panel 32A, and is recorded together with the radiation image information GA in the memory 72.

After the radiation image information GA and the scanned position information MA have been read and before a next breast 30 is imaged, the erasing light source 36 is energized to apply the erasing light to the radiation conversion panel 32A to remove unwanted electric charges stored in the radiation conversion panel 32A.

After the unwanted electric charges are removed, the radiation image information of the next breast 30 is captured and stored in the charge storage region 56 of the radiation conversion panel 32A. Then, the reading light is applied to read radiation image information GB and scanned position information MB as shown in FIG. 6B, which are then recorded in the memory 72. At this time, a residue of the previously captured radiation image information GA may have remained unremoved in the radiation conversion panel 32A. If such a residue of the previously captured radiation image information GA exists, then such residual radiation image information GA', the radiation image information GB and the scanned position information MB are read from the radiation conversion panel 32A.

The radiation image information GB which contains the residual radiation image information GA' is corrected by the correcting means 74. For removing the residual radiation image information GA' that remains in the radiation conversion panel 32A, the correcting means 74 multiplies the previously captured radiation image information GA by a predetermined coefficient to calculate the residual radiation image information GA'. The predetermined coefficient is determined in view of the characteristics of the radiation conversion panel 32A, a period of time that has elapsed after the erasing light has been applied to the radiation conversion panel 32A, etc.

Then, in order to compensate for a deviation between the position where the previous radiation image information GA is read by the reading light from the reading light source 34 and the position where the present radiation image information GB is read by the reading light from the reading light source 34, the correcting means 74 determines an association between the scanned position information MA, MB and points P, Q obtained from the transmissive areas 82 having the width LS, and also determines an association between the scanned position information MA, MB obtained from the transmissive areas 82 having the width LT.

Figure 6C:
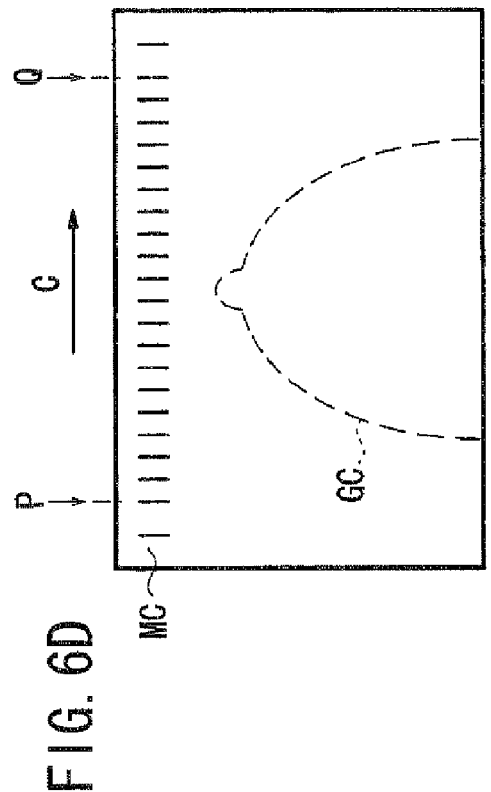
Figure 6B:
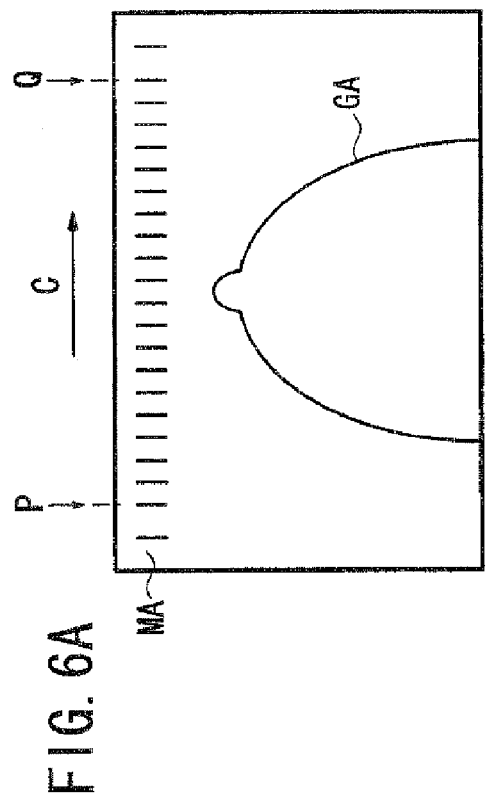

Based on the determined associations between the scanned position information MA, MB, the radiation image information GB and the residual radiation image information GA' are determined, and the residual radiation image information GA' is subtracted from the radiation image information GB containing the residual radiation image information GA', thereby producing corrected desired radiation image information GB (FIG. 6C). The radiation image information GB and the residual radiation image information GA' can be determined by moving or enlarging or reducing the radiation image information GB or the residual radiation image information GA' stored in the memory 72 according to the scanned position information MA, MB.

Even if the positions where the radiation conversion panel 32A starts and stops being read by the reading light source 34 are displaced, or the positions where radiation image information GA, GB is read are displaced due to a change in the scanning speed of the reading light source 34, highly accurate radiation image information GB can be obtained which has been corrected in view of such positional displacements.

According to the above process of capturing radiation image information of the breast 30, immediately after the radiation image information GA and the scanned position information MA are read, the next breast 30 is imaged. Therefore, it is possible to obtain corrected desired radiation image information GB by subtracting the residual radiation image information GA' from the radiation image information GB which contains the residual radiation image information GA', without the need for taking into account a time-depending change of the residual radiation image information GA'. However, if a certain period of time elapses after the radiation image information GA and the scanned position information MA are read and before the next breast 30 is imaged, then the residual radiation image information GA' tends to change with time, and corrected desired radiation image information GB may not be obtained.

Figure 6D:
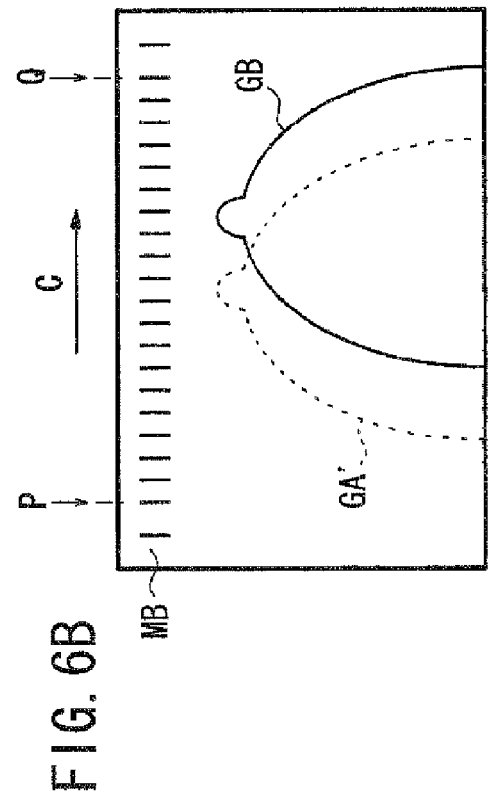

Such a problem is solved as follows: Immediately before radiation image information of the breast 30 is captured, in order to read residual radiation image information GC (see FIG. 6D) remaining in the radiation conversion panel 32A, reading light from the reading light source 34 is applied to the radiation conversion panel 32A to read the residual radiation image information GC and scanned position information MC, which are then stored in the memory 72. Then, the radiation image information of the breast 30 is captured and stored in the charge storage region 56 of the radiation conversion panel 32A. Thereafter, reading light from the reading light source 34 is applied to the radiation conversion panel 32A to read the radiation image information GB of the breast 30 and the scanned position information MB, which are then stored in the memory 72. Then, the radiation image information GB containing the residual radiation image information GC is corrected by the correcting means 74.

Specifically, based on the association between the scanned position information MB, MC, the residual radiation image information GC is subtracted from the radiation image information GB which contains the residual radiation image information GC, thereby obtaining corrected desired radiation image information GB (FIG. 6C). When the residual radiation image information GC is to be subtracted from the radiation image information GB which contains the residual radiation image information GC, it is preferable to subtract the residual radiation image information GC which has been corrected by being multiplied by a predetermined coefficient in view of a change in the radiation image information which may occur when the residual radiation image information GC is read by the reading light applied thereto.

Figure 8:
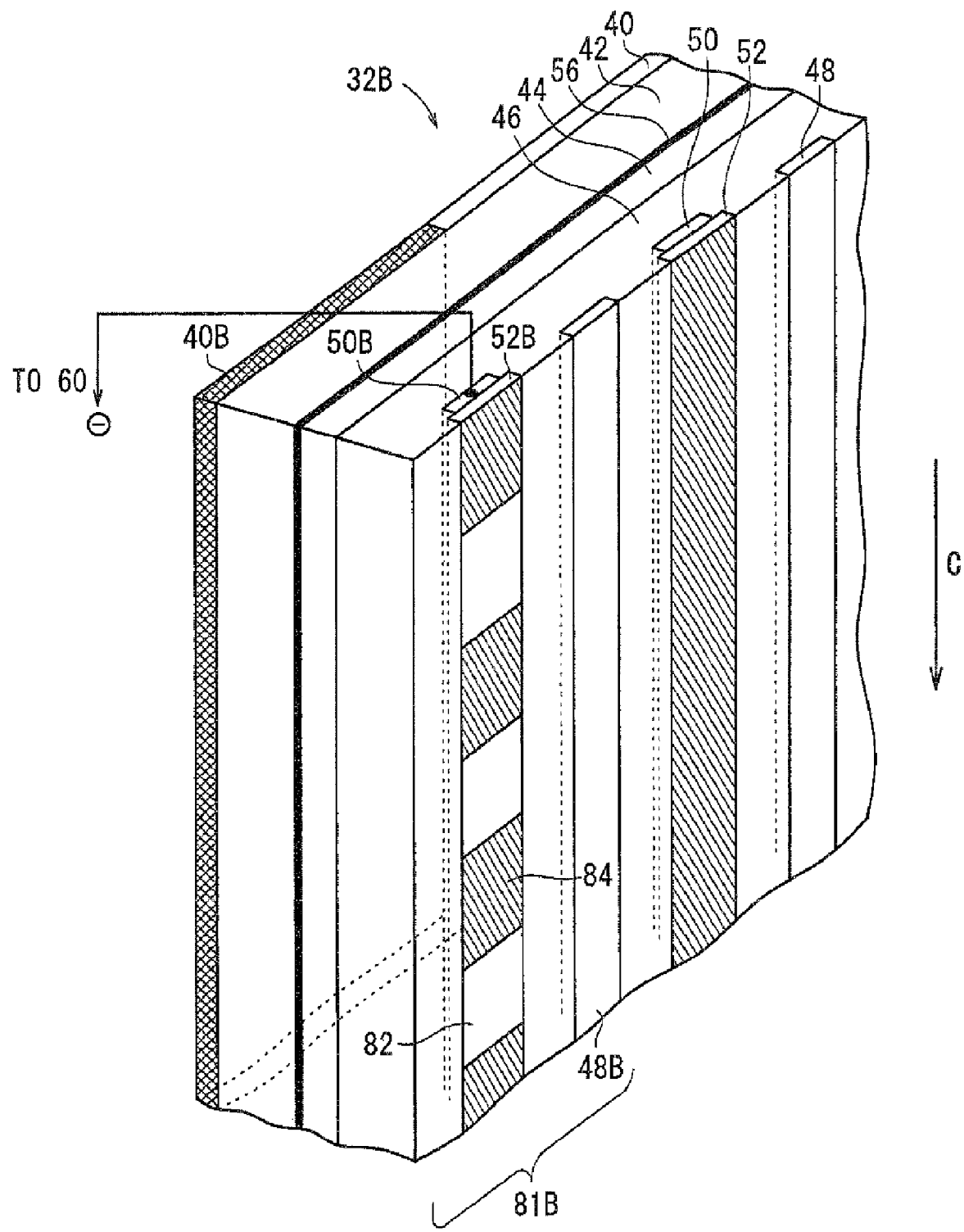
FIG. 8 is an enlarged fragmentary perspective view of a modified radiation conversion panel.

FIG. 8 shows in enlarged fragmentary perspective a marker 81B in a modified radiation conversion panel 32B. As with the radiation conversion panel 32A shown in FIG. 4, the glass substrate 38 is omitted from illustration in FIG. 8. The marker 81B basically comprises a first linear electrode layer 48B, a linear insulating layer 52B, a second linear electrode layer 50B, and an insulating layer 40B which is formed by being coated with a material which serves as a shield against the radiation. As with the radiation conversion panel 32A, the linear insulating layer 52B comprises an alternate array of transmissive areas 82 for transmitting the reading light therethrough and light-blocking areas 84 for blocking the reading light, which are arranged at suitable intervals. For reading scanned position information, a negative voltage is applied from the power supply circuit 60 to the second linear electrode layer 50B.

When reading light from the reading light source 34 is applied through the transmissive areas 82 to the reading photoconductive layer 46, positive electric charges generated in the reading photoconductive layer 46 are moved into the second linear electrode layer 50B to which the negative voltage is applied, and are eliminated in the second linear electrode layer 50B. Negative electric charges are moved into the first linear electrode layer 48B and then flow into the charge amplifier 64. The negative electric charges are detected as a current representing scanned position information, which is stored in the memory 72.

Figure 9:
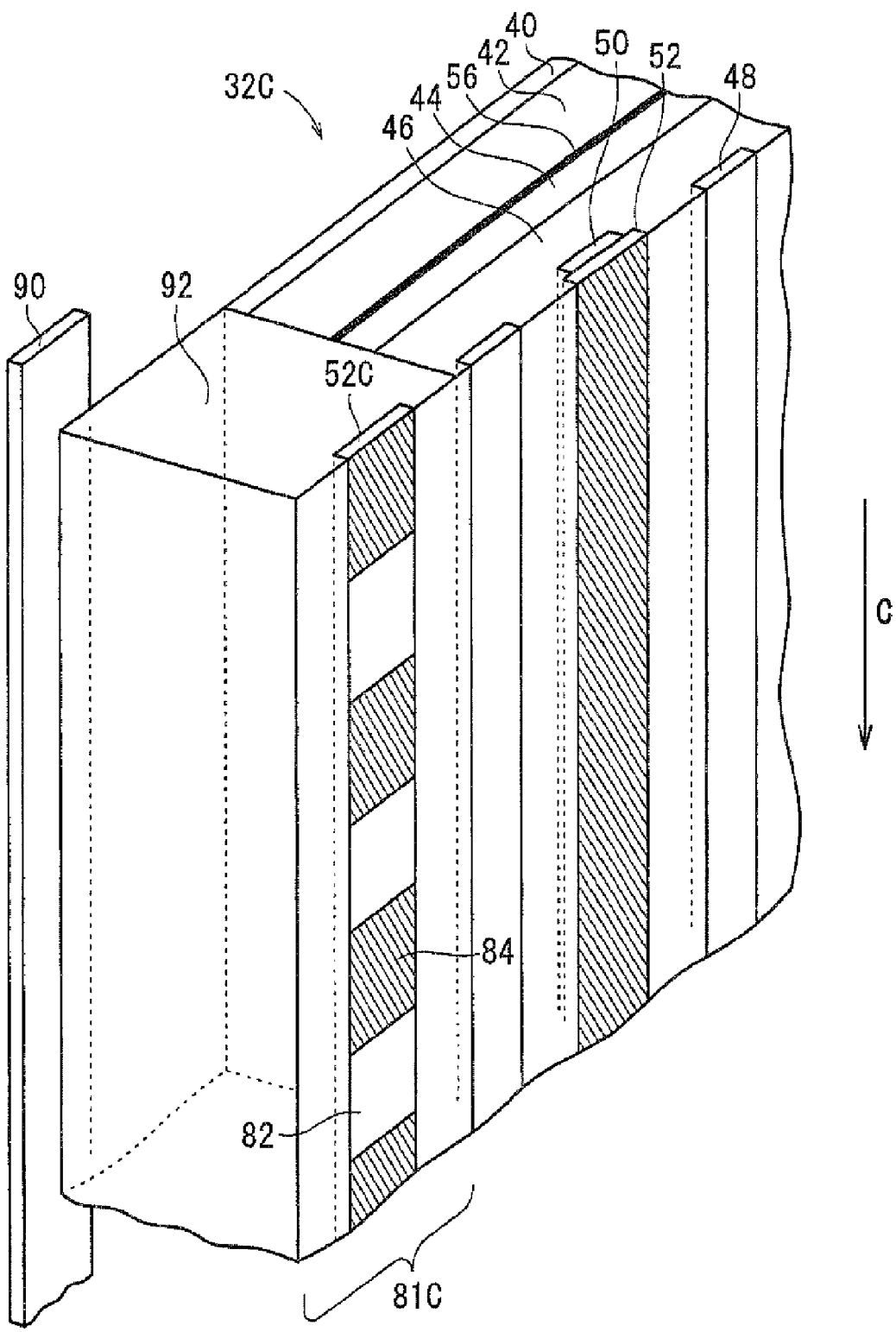
FIG. 9 is an enlarged fragmentary perspective view of another modified radiation conversion panel.

FIG. 9 shows in enlarged fragmentary perspective a marker 81C of another modified radiation conversion panel 32C. The marker 81C comprises a linear insulating layer 52C disposed in a transmissive layer 92 and having an alternate array of transmissive areas 82 and light-blocking areas 84. A photodetector 90 or a light introduction member for introducing the reading light into the photodetector 90 is disposed across the transmissive layer 92 from the linear insulating layer 52C. The reading light from the reading light source 34 is applied through the transmissive areas 82 to the photodetector 90 or through the transmissive areas 82 and the light introduction member to the photodetector 90. The photodetector 90 produces a detected signal which is stored as scanned position information in the memory 72.

Figure 10:
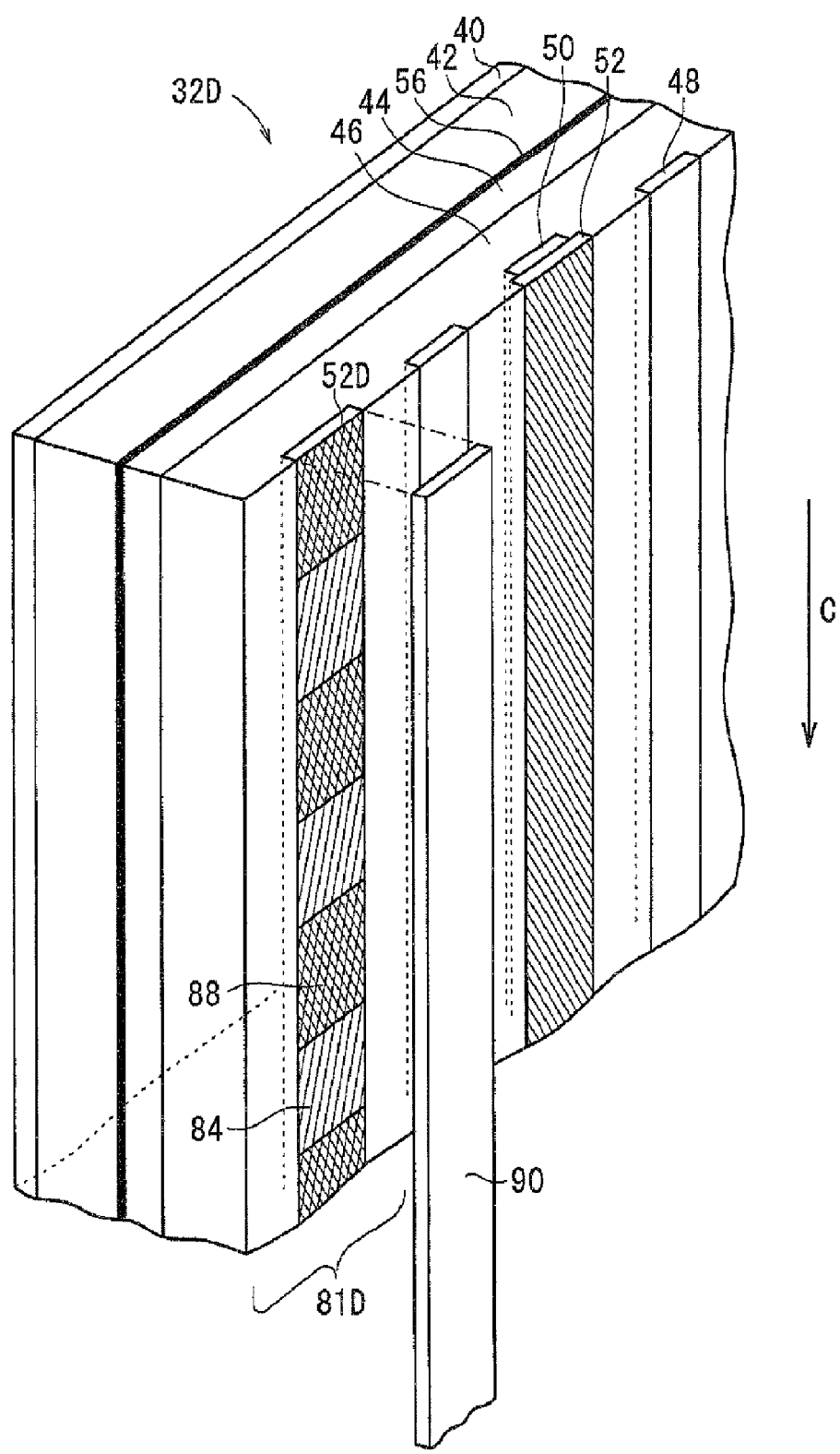
FIG. 10 is an enlarged fragmentary perspective view of still another modified radiation conversion panel.

FIG. 10 shows in enlarged fragmentary perspective a marker 81D of still another modified radiation conversion panel 32D. The marker 81D includes a linear insulating layer 52D comprising an alternate array of reflective areas 88 and light-blocking areas 84. A photodetector 90 or a light introduction member for introducing the reading light into the photodetector 90 is disposed in facing relation to the linear insulating layer 52D. The reading light from the reading light source 34 is reflected by the reflective areas 88 to the photodetector 90 or through the light introduction member to the photodetector 90. The photodetector 90 produces a detected signal which is stored as scanned position information in the memory 72.

Figure 11:
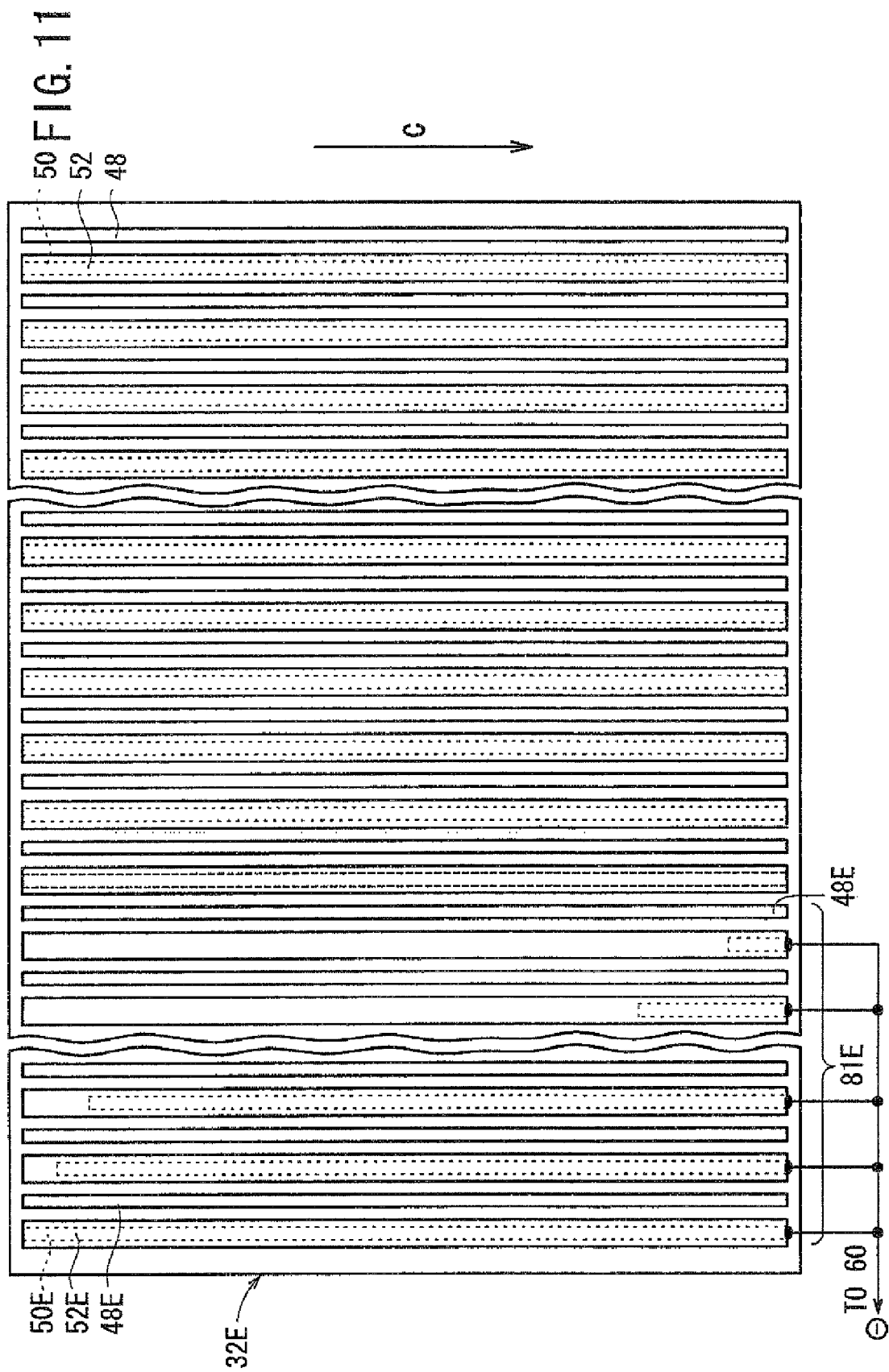
FIG. 11 is a plan view of yet another modified radiation conversion panel.

FIG. 11 shows in plan a marker 81E of yet another modified radiation conversion panel 32E. The marker 81E includes a plurality of linear insulating layers 52E and a plurality of second linear electrode layers 50E combined respectively with the linear insulating layers 52E. The second linear electrode layers 50E have respective lengths which are progressively shorter stepwise along the direction in which the radiation conversion panel 32E is scanned with the reading light. For reading scanned position information, the power supply circuit 60 applies a negative voltage to the second linear electrode layers 50E, and first linear electrode layers 48E disposed adjacent to the second linear electrode layers 50E read currents depending on the lengths of the second linear electrode layers 50E. The read currents are stored as scanned position information in the memory 72. The surface area of the radiation conversion panel 32E which is opposite the linear insulating layers 52E should preferably be coated with a material which serves as a shield against the radiation.

Figure 12:
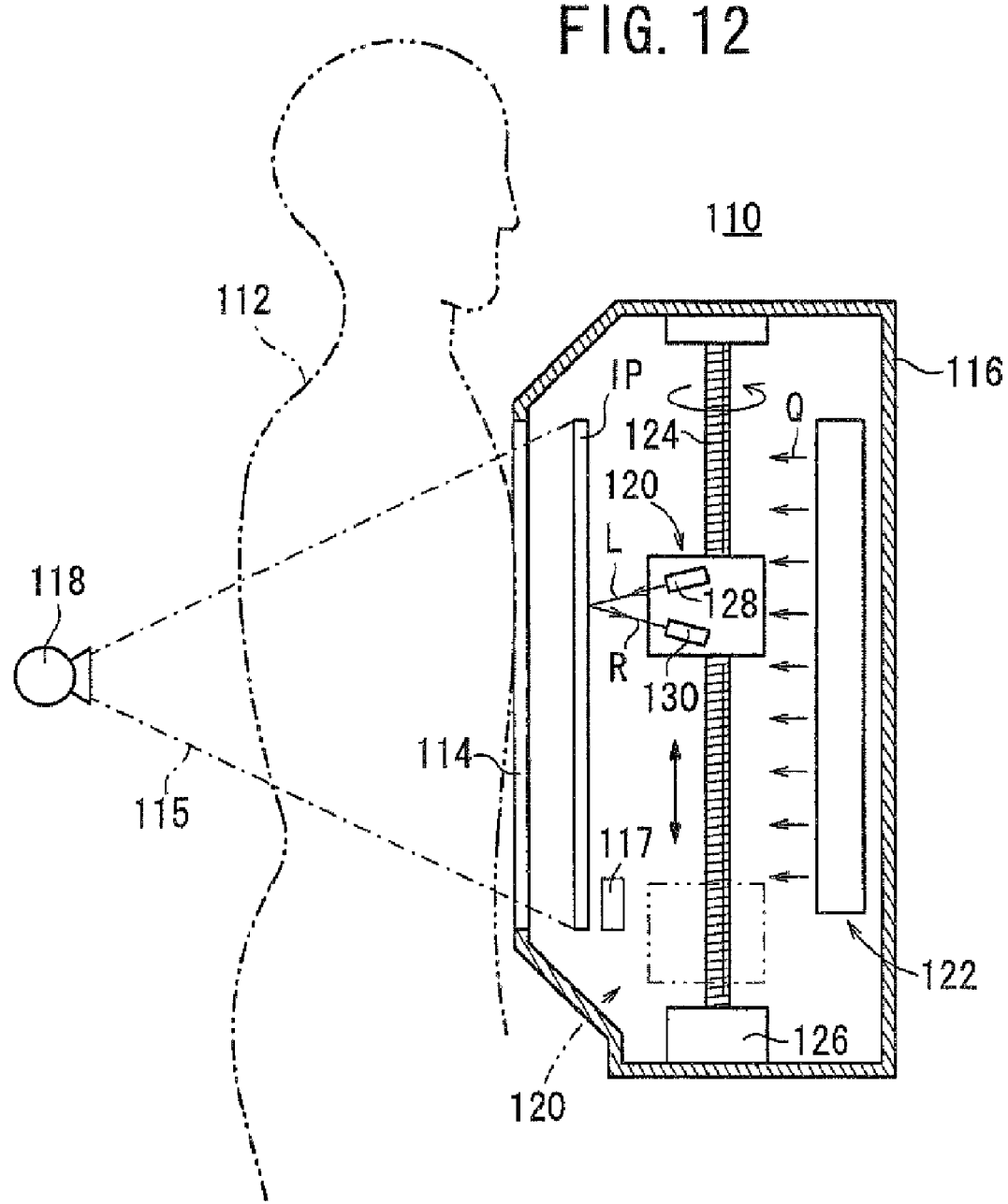
FIG. 12 is a vertical cross-sectional view of an image capturing apparatus according to a second embodiment of the present invention.

FIG. 12 shows in vertical cross section an image capturing apparatus 110 according to a second embodiment of the present invention, which incorporates a radiation image information reading apparatus according to the present invention. According to the second embodiment, a stimulable phosphor panel IP is used as a radiation conversion panel.

As shown in FIG. 12, the image capturing apparatus 110 comprises an image capturing base 114 for positioning a region to be imaged of a subject 112 and a casing 116 housing therein the image capturing base 114 and other components in a light-shielded fashion. The image capturing apparatus 110 also includes an X-ray source 118 disposed opposite the image capturing base 114 for applying an X-ray radiation 115 to the subject 112.

The stimulable phosphor panel IP is disposed substantially parallel to the image capturing base 114 in the image capturing apparatus 110. The image capturing apparatus 110 houses therein a reading unit 120 for reading radiation image information stored in the stimulable phosphor panel IP and an erasing unit 122 for erasing residual radiation image information remaining in the stimulable phosphor panel IP from which the desired radiation image information has been read. A phototimer 117, which is a radiation dose detecting sensor for detecting the dose of the X-ray radiation 115 that has passed through the stimulable phosphor panel IP, is disposed in a position between the stimulable phosphor panel IP and the reading unit 120 where the phototimer 117 will not interfere with the operation of the reading unit 120 to read the radiation image information from the stimulable phosphor panel IP.

The reading unit 120 is threaded over a vertical ball screw 124 rotatably disposed in the casing 116. When the ball screw 124 is rotated about its own axis by a drive motor 126 connected to the lower end thereof, the reading unit 120 is vertically moved on the ball screw 124 along the stimulable phosphor panel IP. The reading unit 120 comprises a stimulating light source 128 for applying stimulating light L having a wavelength ranging from 600 to 750 nm, for example, to the stimulable phosphor panel IP in which radiation image information has been stored, and a photoelectric transducer 130 for detecting stimulated light R that is emitted from the stimulable phosphor panel IP upon exposure to the stimulating light L and represents radiation image information of the subject 112, and converting the stimulated light R into an electric signal.

Figure 13:
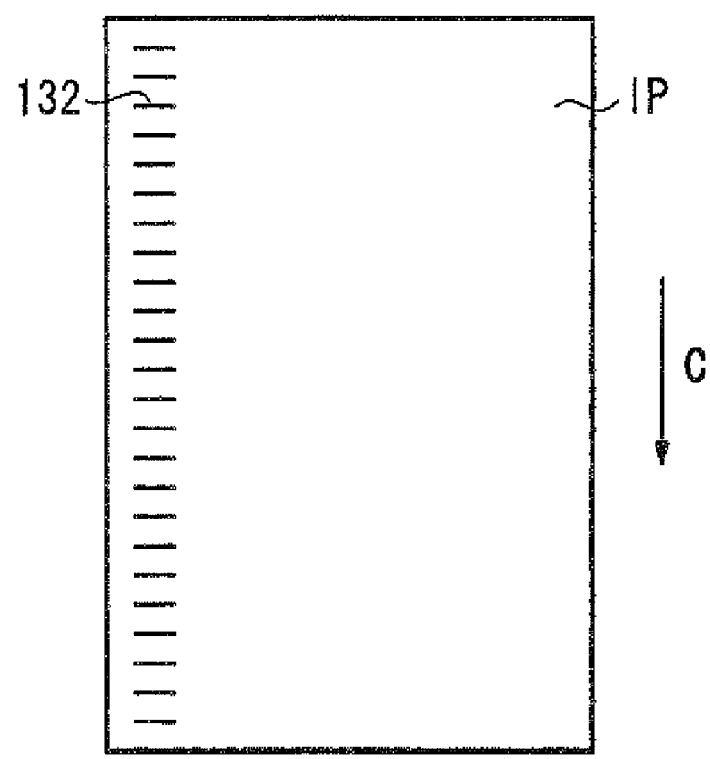
FIG. 13 is a plan view of a stimulable phosphor panel according to the second embodiment of the present invention.

As shown in FIG. 13, the stimulable phosphor panel IP includes a marker 132 comprising a plurality of equally spaced successive areas for producing scanned position information. The marker 132 extends along the scanning direction indicated by the arrow C in which the stimulable phosphor panel IP is scanned by the reading unit 120. The marker 132 is formed by peeling off portions of a phosphor layer on the surface of the stimulable phosphor panel IP. While the stimulable phosphor panel IP is being scanned by the reading unit 120, the scanned position information is acquired from the marker 132 at the time no stimulated light R is emitted from the marker 132.

Figure 14:
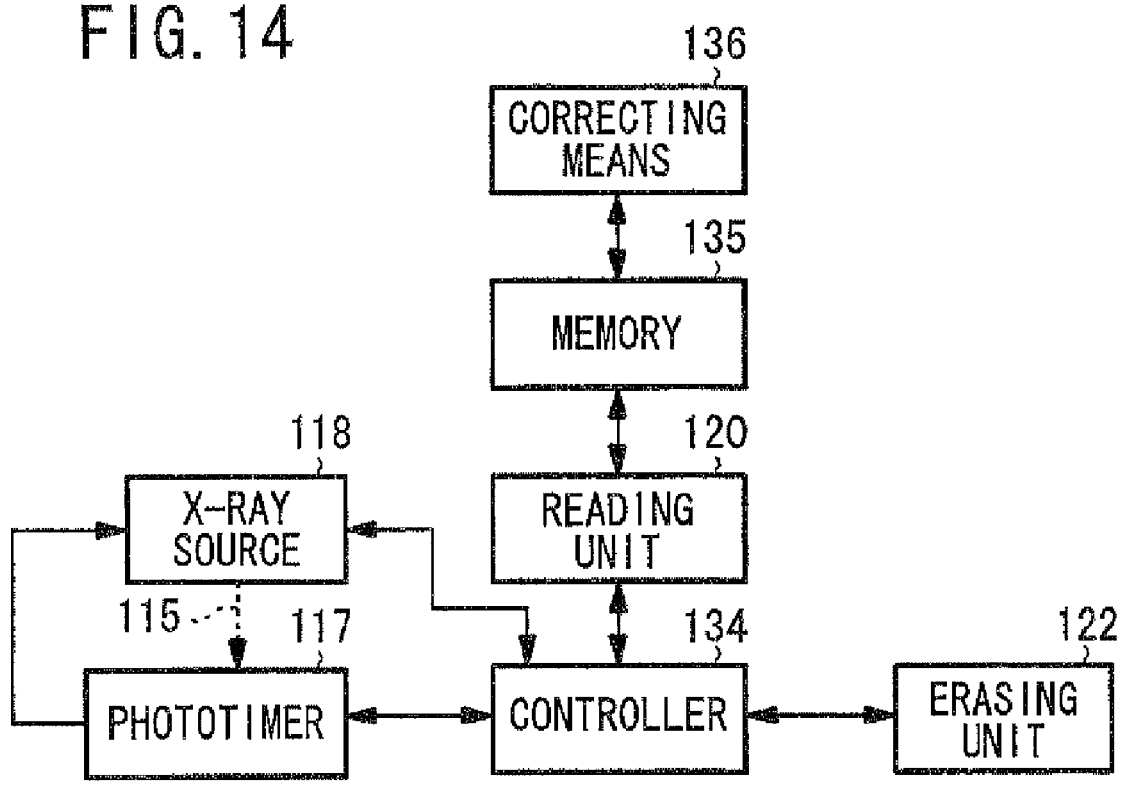
FIG. 14 is a block diagram of a control circuit of the image capturing apparatus shown in FIG. 12.
Figure 15A:
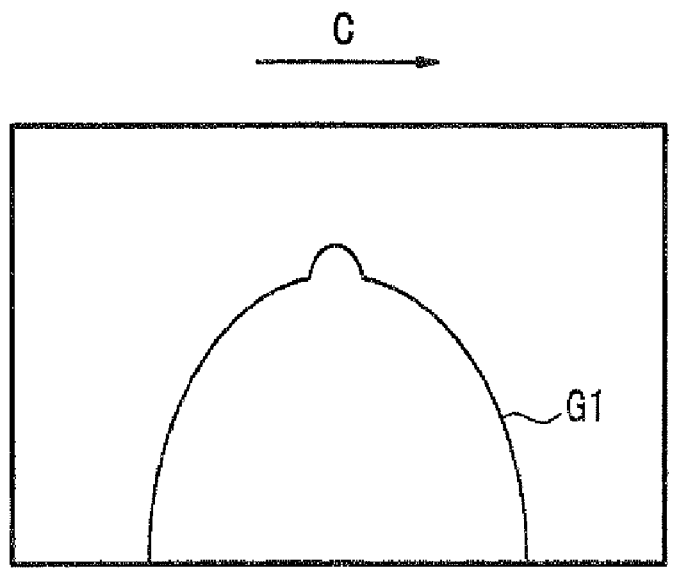
FIGS. 15A and 15B are diagrams illustrative of the manner in which radiation image information is recorded in a conventional radiation image information reading apparatus.
Figure 15B:
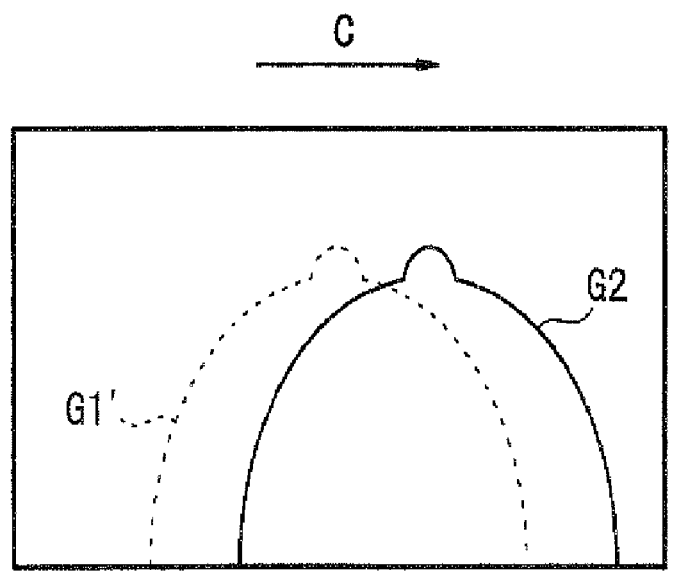

FIG. 14 shows in block form a control circuit of the image capturing apparatus 110. The control circuit includes a controller 134 for controlling the image capturing apparatus 110. Specifically, the controller 134 controls the X-ray source 118 according to image capturing conditions, and also controls the reading unit 120 and the erasing unit 122. Radiation image information and scanned position information that are read from the stimulable phosphor panel IP by the reading unit 120 are stored in a memory 135. A correcting means 136 corrects the radiation image information stored in the memory 135 based on the presently acquired scanned position information and previously acquired radiation image information and scanned position information associated therewith.

The image capturing apparatus 110 operates as follows: The reading unit 120 is moved in one of the directions indicated by the arrow along the stimulable phosphor panel IP to scan the stimulable phosphor panel IP to read the radiation image information stored in the stimulable phosphor panel IP. At the same time that the radiation image information is read, the scanned position information is also read from the marker 132 by the reading unit 120. The radiation image information and the scanned position information are stored in the memory 135. The correcting means 136 corrects the radiation image information stored in the memory 135 based on the presently acquired radiation image information and scanned position information.

The image capturing apparatus 110 is capable of accurately recognizing the position where the stimulable phosphor panel IP is scanned by the reading unit 120. Therefore, the image capturing apparatus 110 allows the radiation image information stored in the stimulable phosphor panel IP to be read highly accurately without being adversely affected by past residual radiation image information that remains in the stimulable phosphor panel IP.

In the embodiment shown in FIG. 13, the marker 132 is formed by peeling off portions of a phosphor layer on the surface of the stimulable phosphor panel IP. However, the marker 132 may comprise a plurality of equally spaced successive reflective areas for reflecting the stimulating light L. If the marker 132 comprises such reflective areas, then scanned position information is generated when the stimulating light L reflected by the marker 132 is accurately read by the photoelectric transducer 130.

Although certain preferred embodiments of the present invention have been shown and described in detail, it should be understood that various changes and modifications may be made therein without departing from the scope of the appended claims.

What is claimed is:

1. A radiation conversion panel for recording therein radiation image information by being irradiated with a radiation and for allowing recorded radiation image information to be read by being scanned with reading light, comprising
a marker for acquiring scanned position information representing a position where the radiation conversion panel is scanned by the reading light, wherein both said radiation image information and said scanned position information can be read by said reading light, and
wherein said radiation conversion panel comprises a radiation solid-state detector for storing said radiation image information as electric charge information and generating a current depending on said electric charge information when irradiated with said reading light.

2. A radiation conversion panel according to claim 1, wherein said marker comprises an alternate array of transmissive areas for transmitting said reading light therethrough and light-blocking areas for blocking said reading light, which are arranged at predetermined intervals along a direction in which the radiation conversion panel is scanned by the reading light, and wherein said scanned position information is generated based on said reading light which has passed through said transmissive areas.

3. A radiation conversion panel according to claim 1, wherein said marker comprises an alternate array of reflective areas for reflecting said reading light and non-reflective areas for not reflecting said reading light, which are arranged at predetermined intervals along a direction in which the radiation conversion panel is scanned by the reading light, and wherein said scanned position information is generated based on said reading light which has been reflected by said reflective areas.

4. A radiation conversion panel according to claim 1, wherein said marker comprises a plurality of electrodes for collecting electric charge information generated when irradiated with said reading light, said electrodes being arrayed in a direction perpendicular to a direction in which the radiation conversion panel is scanned by the reading light, and having respective lengths which vary stepwise and are in the direction in which the radiation conversion panel is scanned by the reading light, and wherein said electric charge information collected by said electrodes is used as said scanned position information.

5. An apparatus for reading radiation image information stored in a radiation conversion panel for recording therein radiation image information by being irradiated with a radiation and for allowing recorded radiation image information to be read by being scanned with reading light, comprising:
  reading means for scanning said radiation conversion panel, which has a marker for acquiring scanned position information representing a position where the radiation conversion panel is scanned by the reading light, with said reading light, to read said radiation image information and said scanned position information;
  storing means for storing said radiation image information in association with said scanned position information;
  correcting means for correcting said radiation image information associated with said scanned position information read by said reading means, based on a residue of past radiation image information remaining in said radiation conversion panel after said radiation image information has been read therefrom, and associated with said scanned position information; and
  wherein said radiation conversion panel comprises a radiation solid-state detector for storing said radiation image information as electric charge information and generating a current depending on said electric charge information when irradiated with said reading light.

6. An apparatus according to claim 5, wherein said marker comprises an alternate array of transmissive areas for transmitting said reading light therethrough and light-blocking areas for blocking said reading light, which are arranged at predetermined intervals along a direction in which the radiation conversion panel is scanned by the reading light, and wherein said scanned position information is generated based on said reading light which has passed through said transmissive areas.

7. An apparatus according to claim 5, wherein said marker comprises an alternate array of reflective areas for reflecting said reading light and non-reflective areas for not reflecting said reading light, which are arranged at predetermined intervals along a direction in which the radiation conversion panel is scanned by the reading light, and wherein said scanned position information is generated based on said reading light which has been reflected by said reflective areas.

8. An apparatus according to claim 5, wherein said marker comprises a plurality of electrodes for collecting electric charge information generated when irradiated with said reading light, said electrodes being arrayed in a direction perpendicular to a direction in which the radiation conversion panel is scanned by the reading light, and having respective lengths which vary stepwise and are in the direction in which the radiation conversion panel is scanned by the reading light, and wherein said electric charge information collected by said electrodes is used as said scanned position information.

9. An apparatus for reading radiation image information stored in a radiation conversion panel for recording therein radiation image information by being irradiated with a radiation and for allowing recorded radiation image information to be read by being scanned with reading light, comprising:
  reading means for scanning said radiation conversion panel, which has a marker for acquiring scanned position information representing a position where the radiation conversion panel is scanned by the reading light, with said reading light, to read said radiation image information and said scanned position information;
  storing means for storing said radiation image information in association with said scanned position information;
  correcting means for correcting desired radiation image information stored in said radiation conversion panel and associated with the scanned position information read from said radiation conversion panel by said reading means, based on a residue of the radiation image information and the scanned position information remaining in said radiation conversion panel and read therefrom by said reading means; and
  wherein said radiation conversion panel comprises a radiation solid-state detector for storing said radiation image information as electric charge information and generating a current depending on said electric charge information when irradiated with said reading light.

10. A method of reading radiation image information stored in a radiation conversion panel for recording therein radiation image information by being irradiated with a radiation and for allowing recorded radiation image information to be read by being scanned with reading light, comprising the steps of:
  scanning said radiation conversion panel, which has a marker for acquiring scanned position information representing a position where the radiation conversion panel is scanned by the reading light, with said reading light, to read said radiation image information and said scanned position information;
  storing said radiation image information in association with said scanned position information;
  correcting said radiation image information associated with said scanned position information, based on a residue of past radiation image information remaining in said radiation conversion panel after said radiation image information has been read therefrom, and associated with said scanned position information; and
  wherein said radiation conversion panel comprises a radiation solid-state detector for storing said radiation image information as electric charge information and generating a current depending on said electric charge information when irradiated with said reading light.

11. A method of reading radiation image information stored in a radiation conversion panel for recording therein radiation image information by being irradiated with a radiation and for allowing recorded radiation image information to be read by being scanned with reading light, comprising the steps of:
  scanning said radiation conversion panel, which has a marker for acquiring scanned position information representing a position where the radiation conversion panel is scanned by the reading light, with said reading light, to read said radiation image information and said scanned position information by reading means;
  storing said radiation image information in association with said scanned position information;
  correcting desired radiation image information stored in said radiation conversion panel and associated with the scanned position information read from said radiation conversion panel by said reading means, based on a residue of the radiation image information and the scanned position information remaining in said radiation conversion panel and read therefrom by said reading means; and
  wherein said radiation conversion panel comprises a radiation solid-state detector for storing said radiation image information as electric charge information and generating a current depending on said electric charge information when irradiated with said reading light.

* * * * *